United States Patent
Masuda et al.

(10) Patent No.: US 10,124,432 B2
(45) Date of Patent: Nov. 13, 2018

(54) ELECTRICAL DISCHARGE MACHINE

(71) Applicant: FANUC Corporation, Yamanashi (JP)

(72) Inventors: Masashi Masuda, Yamanashi (JP);
Akiyoshi Kawahara, Yamanashi (JP);
Yasuo Nakashima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 259 days.

(21) Appl. No.: 15/253,919

(22) Filed: Sep. 1, 2016

(65) Prior Publication Data

US 2017/0066070 A1    Mar. 9, 2017

(30) Foreign Application Priority Data

Sep. 9, 2015   (JP) ................................. 2015-173799

(51) Int. Cl.
*B23H 1/10* (2006.01)
*B23H 11/00* (2006.01)

(52) U.S. Cl.
CPC ............... *B23H 1/10* (2013.01); *B23H 11/00* (2013.01)

(58) Field of Classification Search
CPC .................................. B23H 1/10; B23H 11/00
USPC ....................................................... 219/69.14
See application file for complete search history.

(56) References Cited

U.S. PATENT DOCUMENTS 4,539,458 A * 9/1985 Inoue ....................... B23H 1/10
219/69.17
4,755,651 A * 7/1988 Tsutsui .................... B23H 1/10
219/69.1
5,073,691 A * 12/1991 Magara .................... B23H 7/10
219/69.12

(Continued)

FOREIGN PATENT DOCUMENTS

CN    204234926 U    4/2015
JP    58-206325 A    12/1983

(Continued)

OTHER PUBLICATIONS

Extended European Search Report in EP Application No: 16185215.7, dated Jan. 10, 2017.

(Continued)

*Primary Examiner* — Eric Stapleton
(74) *Attorney, Agent, or Firm* — Hauptman Ham, LLP (57) ABSTRACT

An electrical discharge machine of the present invention is provided with a machining tank stored with a machining fluid in which a workpiece is immersed for electrical discharge machining, a reservoir unit configured to store the machining fluid in order to supply to and recover the machining fluid from the machining tank, a machining tank non-storage condition detecting unit configured to detect that the machining fluid is not stored in the machining tank, an addable amount specifying unit configured to specify the amount of the machining fluid stored in the reservoir unit when it is detected that the machining fluid is not stored in the machining tank and specify an addable amount, which is (Continued)

an addable machining fluid amount, based on the capacity of the reservoir unit and the amount of the machining fluid stored in the reservoir unit, and a machining fluid adding unit configured to add the machining fluid in the addable amount or less.

2 Claims, 5 Drawing Sheets

(56) References Cited

U.S. PATENT DOCUMENTS

| | | | | |
|---|---|---|---|---|
| 5,177,335 | A * | 1/1993 | Hartwig | B01D 29/09 |
| | | | | 210/122 |
| 5,221,467 | A * | 6/1993 | Suzuki | B01D 33/04 |
| | | | | 210/85 |
| 5,223,688 | A * | 6/1993 | Hosoda | B23H 1/10 |
| | | | | 137/577 |
| 5,795,449 | A * | 8/1998 | Sasaki | B23H 7/02 |
| | | | | 204/224 M |
| 5,972,209 | A * | 10/1999 | Shih | B01D 17/0214 |
| | | | | 210/104 |
| 6,427,848 | B1 * | 8/2002 | Shih | B01D 17/0208 |
| | | | | 210/252 |
| 6,533,927 | B1 * | 3/2003 | Hosaka | B23H 1/10 |
| | | | | 210/167.01 |
| 7,175,756 | B2 * | 2/2007 | Kita | B23H 1/10 |
| | | | | 210/121 |
| 7,202,439 | B2 * | 4/2007 | Ishiwata | B23H 1/10 |
| | | | | 137/577 |
| 7,282,660 | B2 * | 10/2007 | Kawahara | B23H 1/10 |
| | | | | 219/69.12 |
| 9,089,914 | B2 * | 7/2015 | Furukawa | B23H 7/04 |
| 2004/0262266 | A1 * | 12/2004 | Ishiwata | B23H 1/10 |
| | | | | 219/69.2 |
| 2005/0023195 | A1 * | 2/2005 | Kita | B23H 1/10 |
| | | | | 210/86 |
| 2006/0219668 | A1 * | 10/2006 | Kawahara | B23H 1/10 |
| | | | | 219/69.12 |
| 2012/0251147 | A1 * | 10/2012 | Gomi | G03G 15/0189 |
| | | | | 399/58 |
| 2013/0206730 | A1 * | 8/2013 | Furukawa | B23H 7/04 |
| | | | | 219/69.12 |

FOREIGN PATENT DOCUMENTS

| | | |
|---|---|---|
| JP | 5-212628 A | 8/1993 |
| JP | 2006281395 A | 10/2006 |
| JP | 2010-214484 A | 9/2010 |

OTHER PUBLICATIONS

Office Action in JP Application No. 2015-173799, dated Sep. 19, 2017, 6 pp.

* cited by examiner

ELECTRICAL DISCHARGE MACHINE

RELATED APPLICATIONS

The present application claims priority to Japanese Patent Application Number 2015-173799, filed Sep. 3, 2015, the disclosure of which is hereby incorporated by reference herein in its entirety.

BACKGROUND OF THE INVENTION

Field of the Invention

The present invention relates to an electrical discharge machine, and more particularly, to an electrical discharge machine with an adding device for a machining fluid used in electrical discharge machining.

Description of the Related Art

Wire electrical discharge machines are mainly used in production sites for metalworking and have been automated with the development of technology. Even in these days, however, replacement of consumption articles and maintenance of machines require human works for a certain time. If these works can be automated, the machines can be operated without rest at night and on holidays, so that the productivity can be improved.

Consumption articles in a wire electrical discharge machine include a tool electrode, filter, ion-exchange device and the like. A machining fluid can also be considered to be a consumption article, since it gradually decreases due to evaporation or adhesion to a workpiece during initial setup work. As a method for automatically adding the machining fluid, an arrangement may be provided such that the fluid level of a reservoir is monitored so that the machining fluid can be added when the fluid surface lowers.

As a technique for keeping the surface level of a machining fluid constant, for example, there is a method in which the amount of the machining fluid is measured and adjusted by detecting the machining fluid surface by means of a float switch. Further, Japanese Patent Application Laid-Open No. 2006-281395 discloses a technique for controlling the surface of a machining fluid to be at a certain level by comparing voltage across the following devices with a predetermined threshold and determining that the fluid surface is at a predetermined height. The devices include a machining tank having a built-in table on which a workpiece is placed and configured to store the machining fluid, a means for grounding the machining tank and/or the table, an electrode configured to detect the machining fluid surface, a voltage application device configured to apply voltage between the electrode and the grounded machining tank and/or table, and the grounded machining tank and/or table.

The height of the surface of the machining fluid in the reservoir can be controlled by applying the machining fluid surface adjustment method using the float switch or the like to monitoring of the change of the machining fluid amount in the reservoir. However, the total machining fluid amount in a wire electrical discharge machine comprising a plurality of reservoirs cannot be determined by this technique alone. In some cases, for example, the machining fluid stored in the machining tank may return and overflow after the exhausted machining fluid is added if only the surface of the machining fluid stored in each reservoir is monitored. If the machining fluid is added during machining, moreover, its quality may greatly change, possibly affecting the machining accuracy. These problems cannot be overcome by the above-described conventional techniques only.

SUMMARY OF THE INVENTION

Accordingly, the object of the present invention is to provide an electrical discharge machine with a machining fluid adding means capable of adding a machining fluid without causing a reservoir to overflow and so as to minimize the influence on machining even during the machining.

An electrical discharge machine according to the present invention is configured so that a workpiece is immersed in a machining fluid and a voltage is applied to a machining gap between an electrode and the workpiece to generate electrical discharge, whereby the workpiece is subjected to machining, and comprises a machining tank stored with the machining fluid in which the workpiece is immersed for electrical discharge machining, a reservoir unit configured to store the machining fluid in order to supply to and recover the machining fluid from the machining tank, a machining tank non-storage condition detecting means configured to detect that the machining fluid is not stored in the machining tank, an addable amount specifying means configured to specify the amount of the machining fluid stored in the reservoir unit when it is detected by the machining tank non-storage condition detecting means that the machining fluid is not stored in the machining tank and specify an addable amount, which is an addable machining fluid amount, based on the capacity of the reservoir unit and the specified amount of the machining fluid stored in the reservoir unit, and a machining fluid adding means configured to add the machining fluid in the addable amount or less.

The machining fluid adding means may be configured to add the machining fluid only during a predetermined machining fluid addition permission period.

The electrical discharge machine may further comprise an addable amount storage means configured to store the addable amount obtained by the addable amount specifying means, and the machining fluid adding means may be configured to add the machining fluid in the addable amount or less stored in the addable amount storage means.

The machining fluid adding means may be configured to add the machining fluid so that the change of the quality of the machining fluid is not greater than a predetermined value.

According to the present invention, a machining fluid can be added for replenishment without causing a reservoir to overflow and the influence on machining can be minimized even during machining, so that continuous unattended operation can be performed while maintaining high-precision machining.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Embodiments of the present invention will now be described with reference to the accompanying drawings.

According to the present invention, an addable amount of machining fluid is specified when the machining fluid is recovered from a machining tank into a reservoir and the machining fluid is added for the specified addable amount. In consideration of the change of the quality of the machining fluid due to the addition, the machining fluid may be added during a period in which the influence on the machining can be suppressed or an additional dose of the machining fluid may be controlled. Based on this arrangement, an overflow from the reservoir due to the addition of the machining fluid and the influence on the machining are suppressed.

Figure 1:
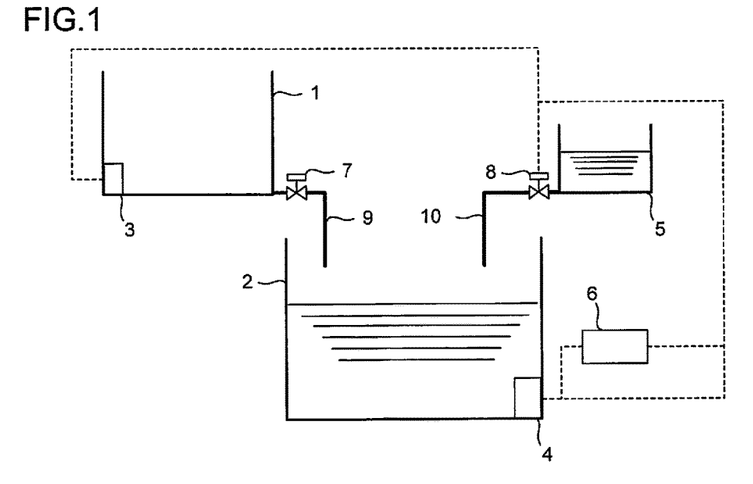
FIG. 1 is a schematic configuration diagram of an electrical discharge machine according to an embodiment of the present invention.

FIG. 1 is a schematic configuration diagram of an electrical discharge machine according to an embodiment of the present invention. The electrical discharge machine of the present invention comprises a machining tank 1 and a reservoir unit 2. The machining tank 1 stores a machining fluid in which a workpiece is to be immersed as it is subjected to electrical discharge machining. The reservoir unit 2 serves to supply the machining fluid to the machining tank 1 and recover the machining fluid from the machining tank 1. The reservoir unit 2 is formed of a single reservoir in one case. In another case, however, the reservoir unit 2 comprises a plurality of reservoirs, such as sewage tanks that store the contaminated machining fluid recovered from the machining tank 1 or clean water tanks that store the decontaminated machining fluid obtained by filtering the contaminated machining fluid stored in the sewage tanks. For ease of explanation, in the present embodiment, these reservoirs will be collectively referred to as the reservoir unit 2. In FIG. 1, dotted lines represent control lines for signal transfer. A supply passage used to supply the machining fluid from the reservoir unit 2 to the machining tank 1 is not shown in FIG. 1.

A machining tank non-storage condition detecting device 3 is attached to the machining tank 1 and can detect that the machining fluid is exhausted from the machining tank 1. The machining tank non-storage condition detecting device 3 can detect the evacuation of the machining tank 1 by detecting by means of, for example, a water level sensor or float switch, that the surface level of the machining fluid in the machining tank 1 is not higher than a predetermined water level near the bottom.

In the electrical discharge machine of the present embodiment, a controller (not shown) controls a valve 7 while electrical discharge machining is not performed for a certain period of time, whereby the machining fluid is recovered from the machining tank 1 to the reservoir unit 2 through a machining fluid recovery passage 9. If the exhaustion of the machining fluid from the machining tank 1 is detected by the machining tank non-storage condition detecting device 3, the addable amount of the machining fluid is specified by an addable amount specifying device 4. The addable amount specifying device 4, like the machining tank non-storage condition detecting device 3, may be formed using a water level sensor or float switch. The addable amount for the reservoir unit 2 can be specified by, for example, calculating the volume of the machining fluid in the reservoir unit 2 by multiplying the surface level of the fluid measured by means of the water level sensor by the cross-sectional area of the reservoir unit 2. Alternatively, the addable amount can be specified by detecting that the volume of the machining fluid in the reservoir unit 2 is not larger than a certain value by identifying the surface level not higher than a preset value by means of the float switch.

More specifically, if a specific volume of the machining fluid can be calculated by the water level sensor or the like, a value obtained by subtracting the "volume of the machining fluid in the reservoir unit 2" from the "capacity of the reservoir unit 2" can be used as the addable amount. If it is detected by the float switch or the like that the volume of the machining fluid in the reservoir unit 2 is smaller than a preset value, a value obtained by subtracting a "preset volume" from the "capacity of the reservoir unit 2" should only be used as the addable amount. If the reservoir unit 2 comprises a plurality of reservoirs, it is necessary only that water level sensors or float switches for specifying the amounts of the machining fluid stored in the individual reservoirs be provided.

A valve 8 is operated so that the specified addable amount of the machining fluid is added from a machining fluid adding device 5 to the reservoir unit 2 through a machining fluid supply passage 10. If the machining fluid is added by this method, it never overflows from the reservoir unit 2. The on/off control of the valve 8 may be performed by the machining fluid adding device 5, based on control signals from the machining tank non-storage condition detecting device 3 and the addable amount specifying device 4, or performed from the controller (not shown).

Figure 2:
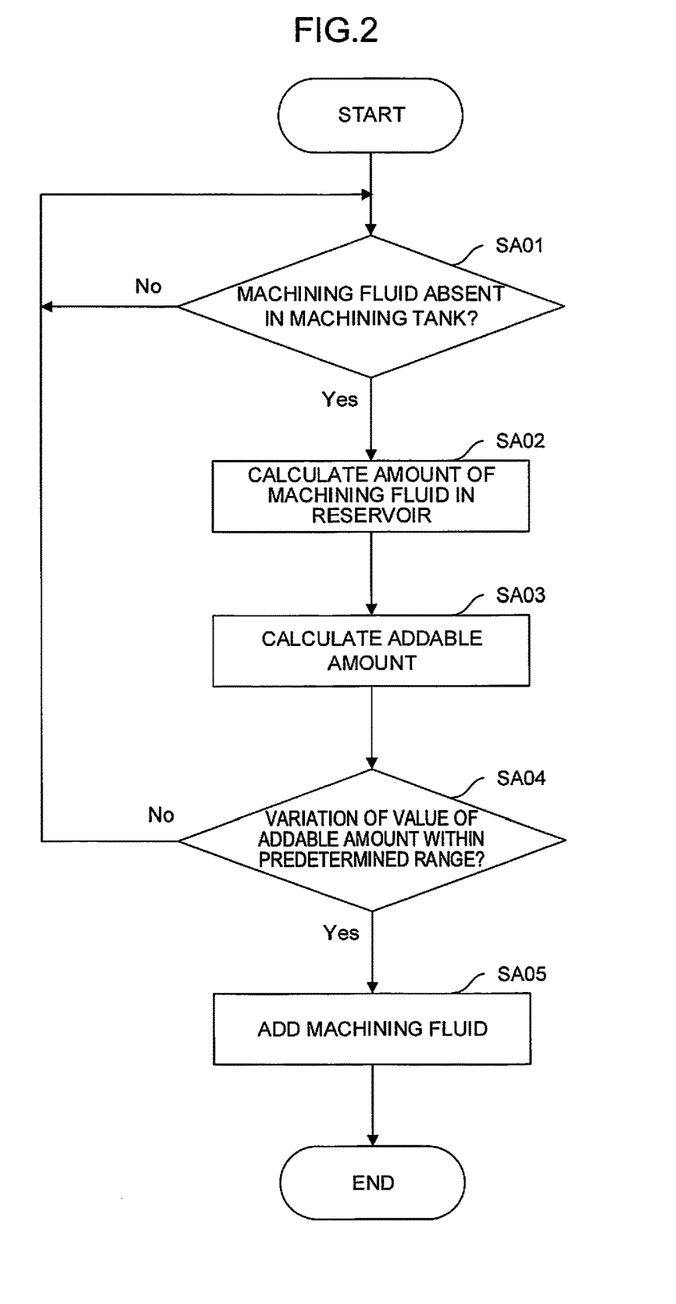
FIG. 2 is a flowchart showing machining fluid supply processing according to a first embodiment of the present invention.

FIG. 2 shows a flowchart showing control performed in the machining fluid adding device 5.

[Step SA01] It is determined by the machining tank non-storage condition detecting device 3 whether or not the machining fluid is absent in the machining tank 1. If the absence of the machining fluid is confirmed, the processing proceeds to Step SA02. If the machining fluid remains, the same determination is repeated.

[Step SA02] The volume amount of the machining fluid in the reservoir unit 2 is calculated by the addable amount specifying device 4.

[Step SA03] The addable amount is calculated based on the volume amount of the machining fluid in the reservoir unit 2 specified by the addable amount specifying device 4.

[Step SA04] The value of the addable amount is calculated by repeating the processes of Steps SA02 and SA03 for a certain period of time and it is determined whether or not the calculated value of the addable amount is greatly changed. If the calculated value is greatly changed, then it means that the machining fluid in the reservoir unit 2 is shaken so that an accurate addable amount cannot be specified. Thereupon, the processing returns to Step SA01 without any addition of the machining fluid. If there is no great change, the processing proceeds to Step SA05.

[Step SA05] The valve 8 is operated so that the machining fluid is added for the addable amount.

Figure 3:
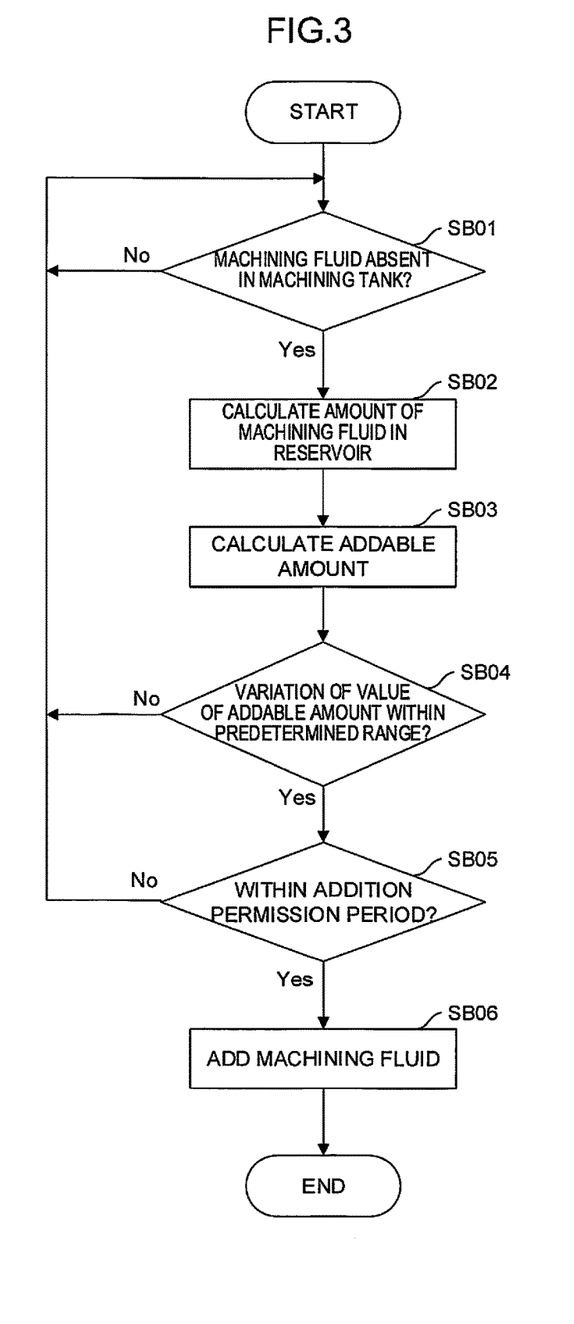
FIG. 3 is a flowchart showing machining fluid supply processing according to a second embodiment of the present invention.

FIG. 3 is a flowchart showing control performed in the machining fluid adding device 5 in the electrical discharge machine of the present embodiment provided with an addition permission period. The addition permission period includes a set period during which the next machining cycle is not started at once, such as a period immediately after the machining is stopped or an initial setup time for the workpiece. In general, the electrical discharge machine performs the machining with the workpiece immersed in the machining fluid. If the fluid quality greatly changes during the machining, therefore, the electrical discharge phenomenon changes, so that the result of the machining may possibly worsen. The influence of the change of the quality of the machining fluid on the machining due to the addition can be suppressed by thus providing the above-described period and restricting the addition of the machining fluid to the machining fluid addition permission period.

[Step SB01] It is determined by the machining tank non-storage condition detecting device 3 whether or not the machining fluid is absent in the machining tank 1. If the absence of the machining fluid is confirmed, the processing proceeds to Step SB02. If the machining fluid remains, the same determination is repeated.

[Step SB02] The volume amount of the machining fluid in the reservoir unit 2 is calculated by the addable amount specifying device 4.

[Step SB03] The addable amount is calculated based on the volume amount of the machining fluid in the reservoir unit 2 specified by the addable amount specifying device 4.

[Step SB04] The value of the addable amount is calculated by repeating the processes of Steps SB02 and SB03 for a certain period of time and it is determined whether the calculated value of the addable amount is not greatly changed. If the calculated value is not greatly changed, the processing proceeds to Step SB05. If the calculated value is greatly changed, then it means that the machining fluid in the reservoir unit 2 is shaken so that an accurate addable amount cannot be specified. Thereupon, the processing returns to Step SB01 without any addition of the machining fluid.

[Step SB05] It is determined whether or not the present time is within the addition permission period. Whether or not the present time is within the addition permission period is determined based on a signal or the like previously set in the controller (not shown) so as to be output during the addition permission period. If the present time is within the addition permission period, the processing proceeds to Step SB06. If not, the processing returns to Step SB01 without any addition of the machining fluid.

[Step SB06] The valve 8 is operated so that the machining fluid is added for the addable amount.

Alternatively, the electrical discharge machine of the present embodiment may be provided with an addable amount storage device 6 configured to be stored with the addable amount specified by the addable amount specifying device 4 so that the machining fluid can be added at a time outside of a period during which machining tank non-storage condition is detected by the machining tank non-storage condition detecting device 3. Since the machining fluid basically tends to decrease, it never overflows from the reservoir unit 2 without regard to the timing of the addition of an additional amount stored in the addable amount storage device 6 at a certain point in time. If the fluid quality greatly changes during the machining, however, the electrical discharge phenomenon changes, so that the result of the machining may possibly worsen. As in the case described with reference to FIG. 3, therefore, the machining fluid is added during the addition permission period so that the influence of the change of the fluid quality on the result of the machining can be reduced, for example.

Figure 4:
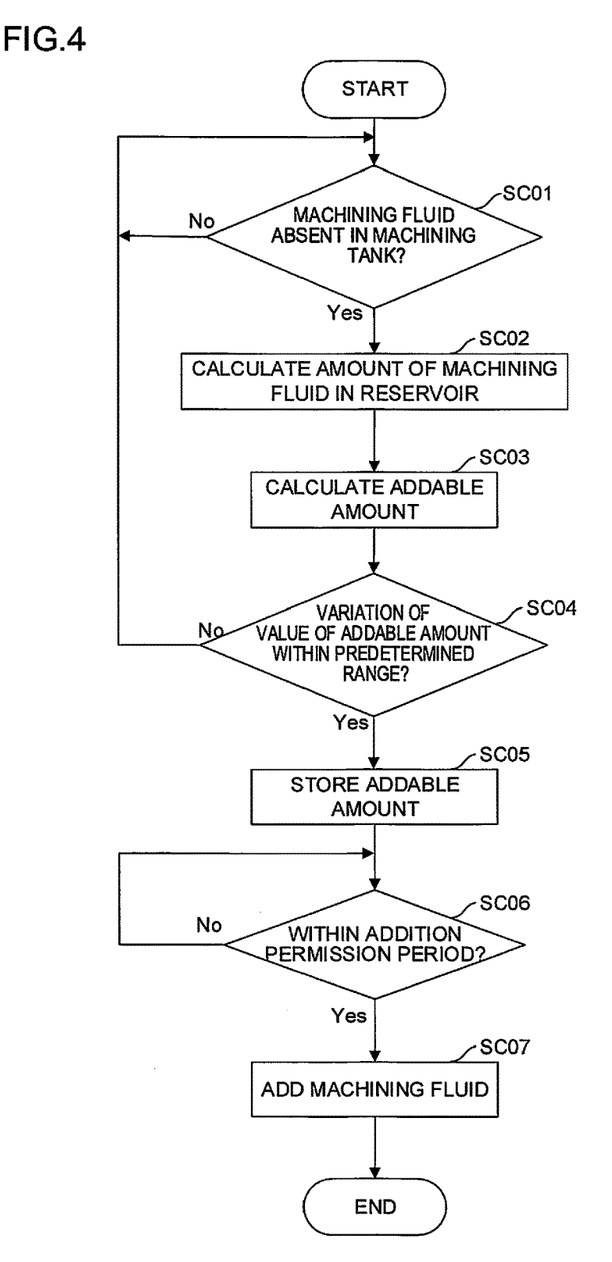
FIG. 4 is a flowchart showing machining fluid supply processing according to a third embodiment of the present invention.

FIG. 4 is a flowchart showing control performed in the machining fluid adding device 5 in the electrical discharge machine of the present embodiment provided with the addable amount storage device 6.

[Step SC01] It is determined by the machining tank non-storage condition detecting device 3 whether or not the machining fluid is absent in the machining tank 1. If the absence of the machining fluid is confirmed, the processing proceeds to Step SC02. If the machining fluid remains, the same determination is repeated.

[Step SC02] The volume amount of the machining fluid in the reservoir unit 2 is calculated by the addable amount specifying device 4.

[Step SC03] The addable amount is calculated based on the volume amount of the machining fluid in the reservoir unit 2 specified by the addable amount specifying device 4.

[Step SC04] The value of the addable amount is calculated by repeating the processes of Steps SC02 and SC03 for a certain period of time and it is determined whether the calculated value of the addable amount is not greatly changed. If the calculated value is not greatly changed, the processing proceeds to Step SC05. If the calculated value is greatly changed, then it means that the machining fluid in the reservoir unit 2 is shaken so that an accurate addable amount cannot be specified. Thereupon, the processing returns to Step SC01.

[Step SC05] The addable amount specified in Step SC04 is stored in the addable amount storage device 6.

[Step SC06] It is determined whether or not the present time is within the addition permission period. Whether or not the present time is within the addition permission period is determined based on a signal or the like previously set in the controller (not shown) so as to be output during the addition permission period. If the present time is within the addition permission period, the processing proceeds to Step SC07. If not, the same determination is repeated.

[Step SC07] The valve 8 is operated so that the machining fluid is added for the addable amount.

In the flowchart of FIG. 4, the processes of Steps SC06 and SC07 for the determination within the addition permission period and the addition of the machining fluid may be repeated so that the machining fluid is supplied for the addable amount stored in the addable amount storage device 6. Thus, if the addition permission period is terminated while the machining fluid is being supplied, the machining fluid supply may be temporarily interrupted after the amount of the machining fluid supplied so far is temporarily stored so that the addition of the machining fluid can be resumed when the addition permission period is entered again. Alternatively, a flow rate of the added machining fluid at which the change of the fluid quality can be then restricted to a certain value may be stored in advance in the machining fluid adding device 5 so that the machining fluid can be added at a flow rate not higher than the stored value. By this method, the influence of the change on the machining can be minimized even during the machining.

Figure 5:
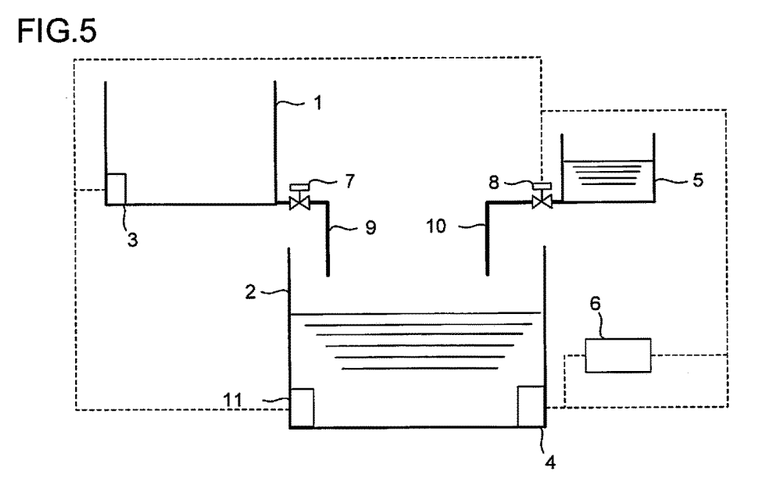
FIG. 5 is a schematic configuration diagram of an electrical discharge machine according to another embodiment of the present invention.

An alternative method may be proposed as a modification in which a sensor 11 for detecting the fluid quality is separately provided as shown in FIG. 5 so that the quality of the machining fluid detected by the sensor 11 can be monitored as the machining fluid is added. For example, changes of the temperature, specific resistance, and other factors of the machining fluid that affect the electrical discharge machining may be monitored so that the addition of the machining fluid can be interrupted if the amount of the changes reaches a certain value. Possibly, moreover, the addition of the machining fluid may be interrupted in advance, based on the amount of change of the fluid quality per unit time, in consideration of a delay in the fluid quality change that can be detected by the sensor.

Figure 6:
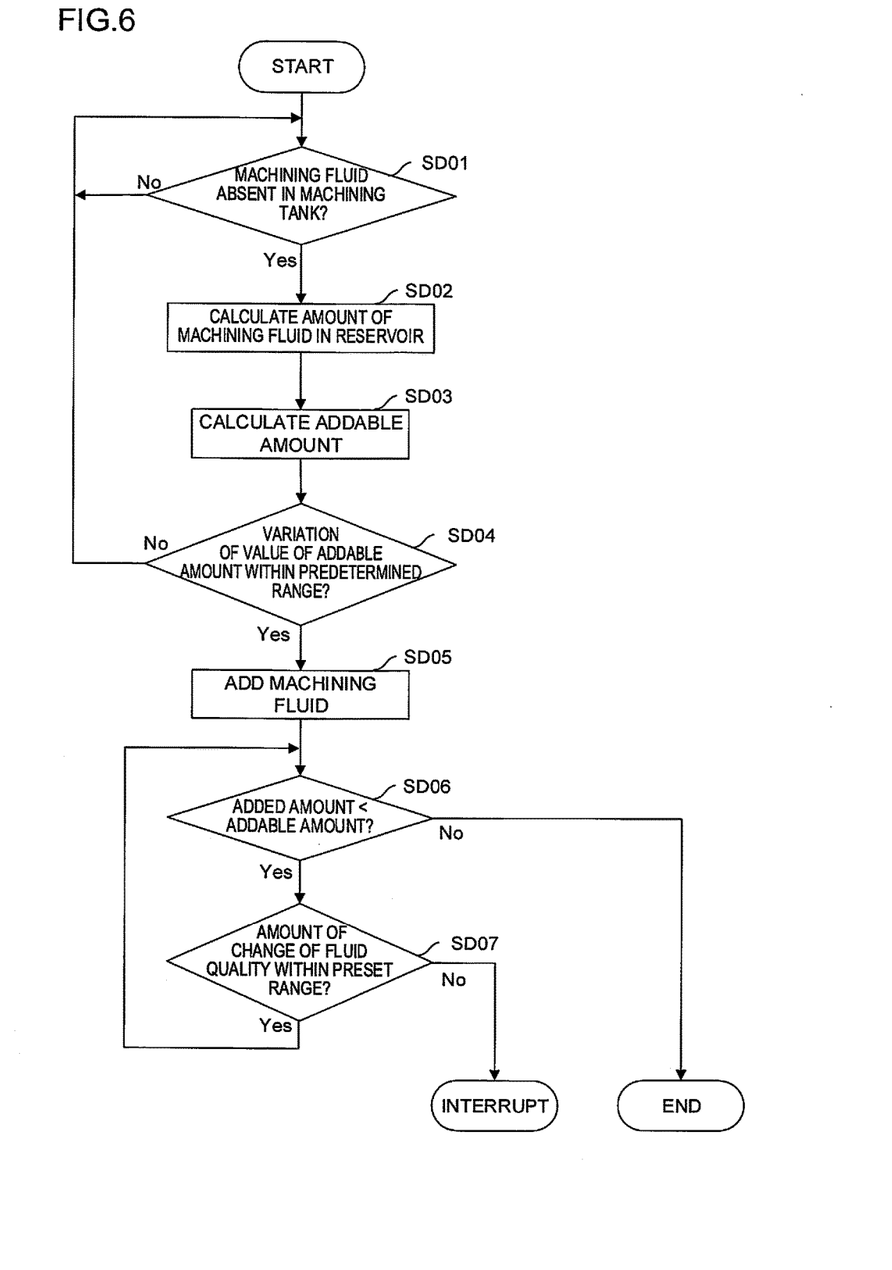
FIG. 6 is a flowchart showing machining fluid supply processing according to another embodiment of the present invention.

FIG. 6 is a flowchart showing control performed in the machining fluid adding device 5 in the electrical discharge machine of the present embodiment in which the fluid quality change is detected by the sensor 11.

[Step SD01] It is determined by the machining tank non-storage condition detecting device 3 whether or not the machining fluid is absent in the machining tank 1. If the absence of the machining fluid is confirmed, the processing proceeds to Step SD02. If the machining fluid remains, the same determination is repeated.

[Step SD02] The volume amount of the machining fluid in the reservoir unit 2 is calculated by the addable amount specifying device 4.

[Step SD03] The addable amount is calculated based on the volume amount of the machining fluid in the reservoir unit 2 specified by the addable amount specifying device 4.

[Step SD04] The value of the addable amount is calculated by repeating the processes of Steps SD02 and SD03 for a certain period of time and it is determined whether the calculated value of the addable amount is not greatly changed. If the calculated value is not greatly changed, the processing proceeds to Step SD05. If the calculated value is greatly changed, then it means that the machining fluid in the reservoir unit 2 is shaken so that an accurate addable amount cannot be specified. Thereupon, the processing returns to Step SD01.

[Step SD05] The valve 8 is operated so that the addition of the machining fluid is resumed after information on the fluid quality detected by the sensor 11 is stored.

[Step SD06] It is determined whether or not the amount of the machining fluid added so far is less than the addable amount. If the added amount is less than the addable amount, the processing proceeds to Step SD07. If not, the addition of machining fluid is terminated.

[Step SD07] The amount of change of the fluid quality is obtained by comparing the information on the fluid quality stored in Step SD05 and the information on the fluid quality detected from the sensor 11, and it is determined whether or not the amount of change of the fluid quality is within a preset range. If the amount of change of the fluid quality is within the preset range, the processing returns to Step SD06. If the preset value is exceeded (or expected to be exceeded) by the amount of change of the fluid quality, the addition of the machining fluid is temporarily interrupted. After the interruption, the addition of the machining fluid should only be resumed when the quality of the machining fluid is somewhat improved (or stabilized).

While embodiments of the present invention have been described herein, the invention is not limited to the above-described embodiments and may be suitably modified and embodied in various forms.

The invention claimed is:

1. An electrical discharge machine configured so that a workpiece is immersed in a machining fluid and a voltage is applied to a machining gap between an electrode and the workpiece to generate electrical discharge, whereby the workpiece is subjected to machining, the electrical discharge machine comprising:
    a machining tank stored with the machining fluid in which the workpiece is immersed for electrical discharge machining;
    a reservoir unit configured to store the machining fluid in order to supply to and recover the machining fluid from the machining tank;
    a machining tank non-storage condition detecting unit configured to detect that the machining fluid is not stored in the machining tank;
    an addable amount specifying unit configured to specify the amount of the machining fluid stored in the reservoir unit when it is detected by the machining tank non-storage condition detecting unit that the machining fluid is not stored in the machining tank and specify an addable amount, which is an addable machining fluid amount, based on the capacity of the reservoir unit and the specified amount of the machining fluid stored in the reservoir unit;
    an addable amount storage unit configured to store the addable amount obtained by the addable amount specifying unit; and
    a machining fluid adding unit configured to add the machining fluid in an amount that is no greater than the addable amount stored in the addable amount storage unit, wherein
    the machining fluid adding unit adds the machining fluid only during a predetermined machining fluid addition permission period.

2. The electrical discharge machine according to claim 1, wherein the machining fluid adding unit adds the machining fluid so that the change in the quality of the machining fluid is not greater than a predetermined value.

* * * * *